US008107466B2

(12) United States Patent
Huang et al.

(10) Patent No.: US 8,107,466 B2
(45) Date of Patent: Jan. 31, 2012

(54) FLEXIBLE NETWORK SWITCH FABRIC FOR CLUSTERING SYSTEM

(75) Inventors: Hung-Cheng Huang, Taoyuan (TW); Ming-Che Yu, Taoyuan (TW); Tomonori Hirai, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 830 days.

(21) Appl. No.: 12/060,655

(22) Filed: Apr. 1, 2008

(65) Prior Publication Data

US 2009/0245135 A1 Oct. 1, 2009

(51) Int. Cl.
*H04L 12/50* (2006.01)

(52) U.S. Cl. ......................... 370/364; 370/402; 370/419

(58) Field of Classification Search ........................ None
See application file for complete search history.

(56) References Cited

U.S. PATENT DOCUMENTS

| | | | | |
|---|---|---|---|---|
| 6,742,069 | B2 * | 5/2004 | Papa et al. | 710/302 |
| 2003/0101426 | A1 * | 5/2003 | Sarkinen et al. | 716/12 |
| 2003/0147375 | A1 * | 8/2003 | Goergen et al. | 370/351 |
| 2008/0043769 | A1 * | 2/2008 | Hirai | 370/420 |
| 2008/0307149 | A1 * | 12/2008 | Hirai et al. | 710/316 |

FOREIGN PATENT DOCUMENTS

TW 200617694 6/2006

OTHER PUBLICATIONS

"PCI Express—An Overview of the PCI Express Standard," National Instruments, Sep. 6, 2006.*

"Implementing Cisco Infiniband on IBM BladeCenter," IBM, Ansari et al. Oct. 2007.*

"Blue Coat systems ProxySG 400 Series Installation Guide", Blue Coat, Jan. 22, 2006.*

David Watts, "Introduction to PCI Express," website information, Oct. 16, 2005, International Business Machines Corp., New York, USA.

Huang, Jian-Yuan, "Introduction to Advanced Telecommunication Computing Architecture,"Journal, Mar. 2006, 79th volume, Naitonal Science and Technology Program for Telecommunicaitons, Hsinchu, Taiwan.

* cited by examiner

*Primary Examiner* — Chirag Shah
*Assistant Examiner* — Jenkey Van

(57) ABSTRACT

A network switch fabric is provided for a clustering system to facilitate flexibility of network-related interconnection selection and system scalability. The network switch fabric includes replaceable network switch(s) and network interface (s) selectively configured on a base board. Multiple types of interconnection protocols with similar characteristics will be able to implement on a common infrastructure of network switch fabric. A pass through card operating as a network interface is also applicable on the network switch fabric to directly connect with an external network. The pass through card allows the network switch fabric supporting the clustering system to be scalable, thereby capable of supporting a large-scale cluster computing.

18 Claims, 4 Drawing Sheets

FLEXIBLE NETWORK SWITCH FABRIC FOR CLUSTERING SYSTEM

FIELD OF INVENTION

The present invention relates to network interface of computer system, and more particularly to a flexible network switch fabric for a clustering system.

BACKGROUND

Typical clustering-based computer usually uses a dedicated network interface for the clustering switch and needs to switch between Gigabit Ethernet, InfiniBand, 10 Gigabit Ethernet and etc. Some flexible clustering system such as Sun Blade 8000 series, product of Sun Microsystems, Inc., has a flexible partitioning for the clustering switch and the network interfaces. However, the assigned physical space is very small and need a completely different design to support different network interfaces.

In a typical clustering system that has multiple 1 U-blade computation nodes, Network Interface Controller (NIC) is usually configured on a mother board as a part of the computation node. And each of the computation nodes is provided with at least one network interface to connect with a centralized network switch module in the clustering system. The actual interconnections between the network interface controllers and the network switch module may be cables or PCB (printed circuit board) such as backplane, middle plane or other PCB-based interconnection.

FIG. 1 shows one of typical implementations of a clustering system. The system includes a clustering network switch, interconnection mean(s) (such as cables or PCB), a head node and four computation nodes. Each node is embedded with a dedicated NIC. In this implementation, the NIC is a part of every computation node and usually effects computation density. However, to achieve a compact design, physically each computation node can not allow enough space for multiple network interfaces (including the network interface controller and its corresponding connector). Namely, each node uses only one type of network interfaces and the clustering network switch will handle all the network switching tasks. Therefore, to facilitate network switching operation between different network interfaces (such as Gigabit Ethernet, InfiniBand, 10 Gigabit Ethernet and etc.) in the clustering system usually requires different system designs.

Some other flexible implementation such as Sun Blade 8000 series, routes system I/O (Input/Output) interface (ex. a PCI Express link) to a module called "Network Express Module" (NEM). However, the allocated physical space is skinny and the implementation on the NEM module is very limited. Based on the given space, most of network interface design needs to be configured on-board together on each node. Then, if the system changes to use different network interface, the whole module needs to be redesigned.

The aforesaid typical implementation includes the following disadvantages: (1) Most of system design is optimized for a single type network interface; (2) Network interface design in some implementations has serious dependency of the computation node design; (3) even if a clustering system has flexible partitioning capability, the allocated physical space is not enough to support multiple network interfaces.

SUMMARY

To solve the prior art problems mentioned above, the present invention provides a flexible network switch fabric for a clustering system. The present invention basically allows the clustering system to support various network interfaces to establish a flexible clustering network. In the present invention a sharing network Interface slot will be able to apply to different network interfaces.

In an embodiment of the present invention, the present invention provides a network switch fabric for a clustering system with multiple nodes. The network switch interface includes a base board, a network switch, multiple network slots, and a first network interface card or a second network interface card. The network switch and the network slots are configured on the base board. The network slots have a sum number of differential pairs. Every network slot is in circuit connection with the network switch and is connected with each of the nodes through one or more system input/output bus. The first network interface card or the second network interface card is selectively inserted in one or more of the network slots; the first network card has a first number of differential pairs and the second network card has a second number of differential pairs. Meanwhile, the sum number is a superset of either the first number or the second number.

In another embodiment of the present invention, the network switch comprises a switch slot selectively inserted with a first network switch card or a second network switch card. The first switch card is compatible with the first network interface card and the second switch card is compatible with the second network interface card.

In another embodiment of the present invention, the network switch fabric further includes a pass through card with a connector interface to directly connect an external network without passing through the network switch.

In short, the present invention has the following advantages: (1) Allow partitioning according to different functions; (2) make the functions of "Input/Output" and "Network" independent of the "Computation" function; (3) Optimized signal assignment by using superset/subset relationship; (4) Use similar electrical characteristics to share the physical routing; and (5) Optimized physical placement and space allocation to achieve different system configurations.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The present invention can be more fully understood by reference to the following description and accompanying drawings, in which.

DETAILED DESCRIPTION

Figure 1:
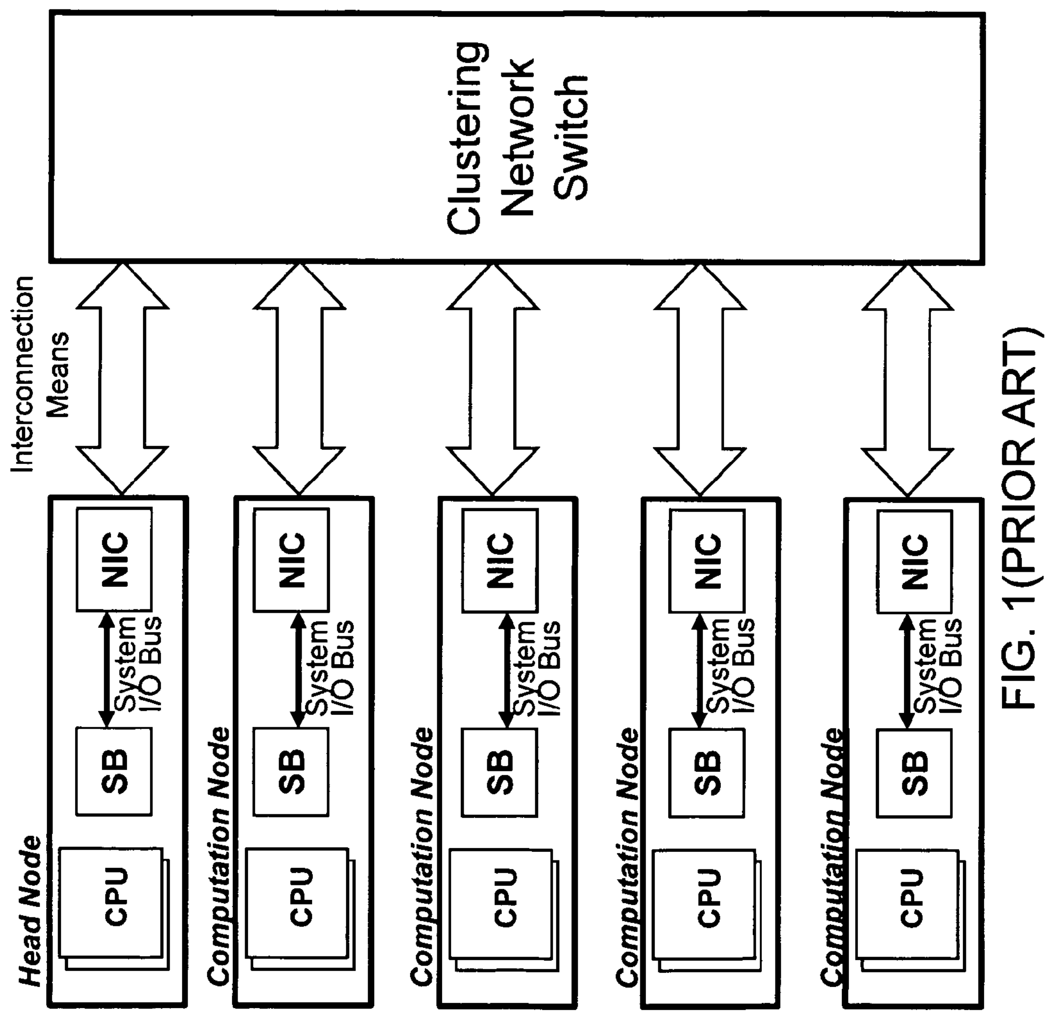
FIG. 1 is a block diagram for a typical implementation of a clustering system in the prior art.

Reference will now be made in detail to the present preferred embodiments of the invention, examples of which are illustrated in the accompanying drawings. Wherever possible, the same reference numbers are used in the drawings and the description refers to the same or the like parts.

Figure 2:
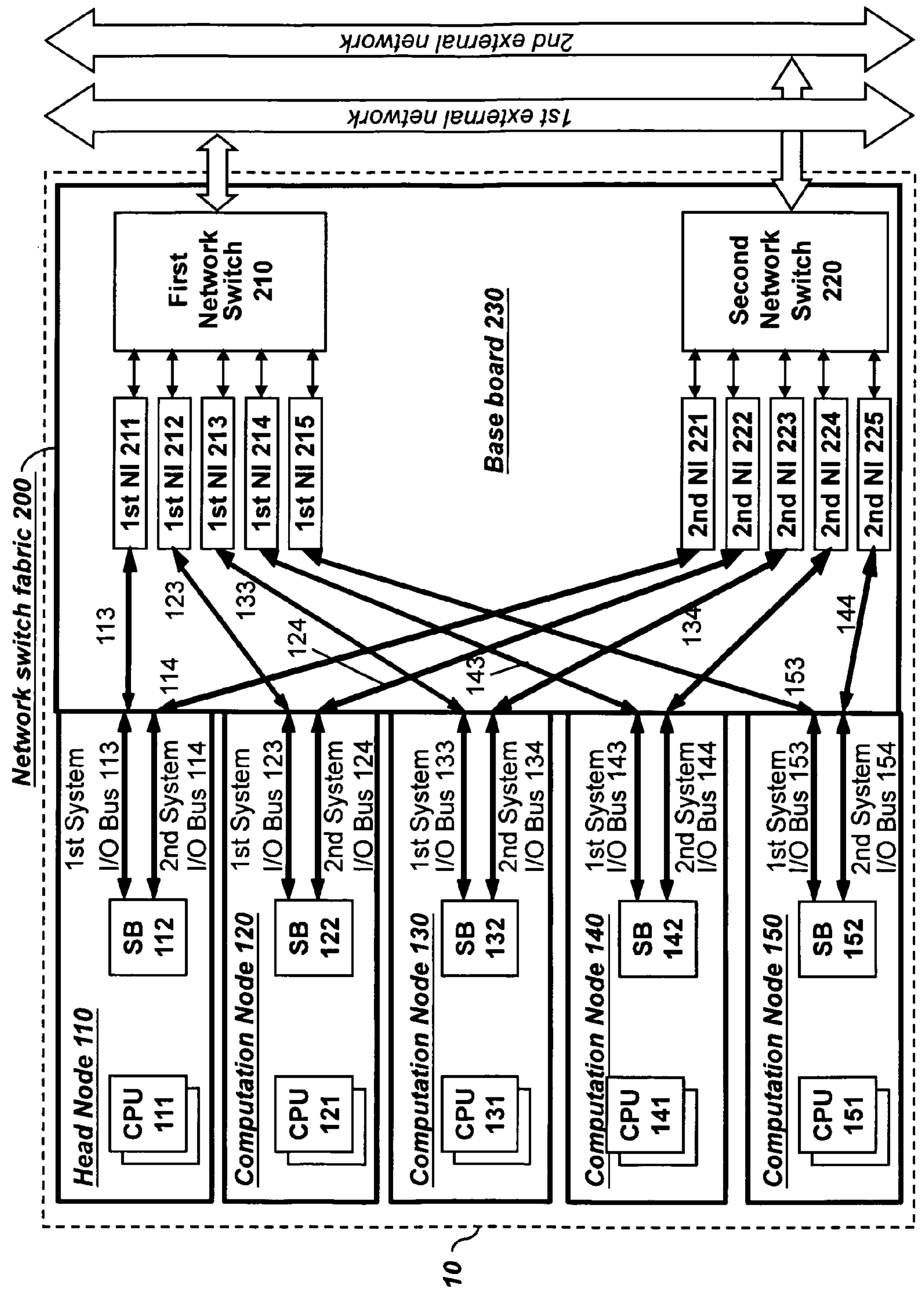
FIG. 2 is an explanatory block diagram for a clustering system and flexible network switch fabric disclosed in an embodiment of the present invention.

Please refer to FIG. 2, a clustering system 10 according to an embodiment of the present invention mainly includes a head node 110 and four computation nodes 120, 130, 140 and 150, and a network switch fabric 200. Similar scale of clustering system is now typically implemented in a single chassis as a personal supercomputer.

Each of the nodes 110~150 basically includes two CPUs (central processing units) 111/121/131/141/151, system memory (not shown) and South bridge (SB) 112/122/132/142/152. The system architecture of the nodes 110~150 depends on user requirements and is not limited to those disclosed in the present invention. Some cases may possibly have North Bridge or integrated bridge chip; the accessing architecture of system memory may have different designs. Each of the nodes 110~150 connects with the network switch fabric 200 through two (first and second) system input/output buses (113, 114)/(123, 124)/(133, 134)/(143, 144)/(153, 154) and applicable board-to-board connectors (not shown). One example for the system input/output buses (113, 114)/(123, 124)/(133, 134)/(143, 144)/(153, 154) is PCI Express, a typical high speed I/O interconnections in a typical computer system nowadays. This provides system-level I/O bus interconnection. Some system further uses an interconnection PCB (printed circuit board) to be a connection interface between the nodes 110~150 and the network switch fabric 200. Such PCB is typically called backplane, middle plane, bottom plane or other type of interconnection board.

The network switch fabric 200 is a sort of I/O boat. It mainly includes a first network switch 210, multiple (5) first network interfaces (NI) 211,212,213,214,215, a second network switch 220, multiple (5) second network interfaces 221, 222, 223, 224, 225; all configured on a based board 230. With the same first and second system input/output buses (113, 114)/(123, 124)/(133, 134)/(143, 144)/(153, 154) routing on the base board 230, the first and second network interfaces 211~215, 221~225 are able to connect with the nodes 110~150 respectively. The first and second network interfaces 211~215, 221~225 are also in circuit connection with the first network switch 210 and the second network switch 220 respectively. And through the first and second network switches 210, 220, the nodes 110~150 will be able to communication with each other through the following two path: (1) the first network interfaces 211~215 and the first network switch 210; and (2) the second network interfaces 221~225 and the second network switch 220. Meanwhile, the first network switch 210 connects with a first external network such as internet, local area network or large scale clustering network. Similarly the second network switch 220 will be connected with a second external network.

The first network interface 211~215, the first network switch 210 and the first external network are compatible with the same protocol, such as InfiniBand, Gigabit Ethernet and etc. Yet the second network interface 221~225, the second network switch 220 and the second external network are compatible with the same protocol, such as InfiniBand, Gigabit Ethernet and etc. Namely the network switch fabric 200 allows the nodes 110~150 to communicate with each other or uplink through the same or different types/protocols of network interfaces.

To be flexible on uplink/interconnection protocol, the first network switch 210 and the second network switch 220 may be replaceable. In some case the first network switch 210 may includes a first switch slot (not shown) inserted with a first network switch card (not shown). Similarly the second network switch 220 may includes a second network switch slot (not shown) inserted with a second network switch card (not shown). If the switch slots are compatible with multiple network interface types, such as InfiniBand, Gigabit Ethernet and etc, the switch slots will be able to support selectively connections with the first network switch card or the second network switch card.

Generally, the first and second network interfaces 211~215, 221~225 may be realized by on-board network interface controllers or so-called network chips. However, to increase more flexibility on uplink/interconnection types, each of the first or second network interfaces 211~215, 221~225 may use the same network slot (not shown) with a first network interface card (not shown) or a second network interface card (not shown) selectively inserted therein. Both the first network interface card and the second network interface card have their network interface controllers respectively but with different interconnection protocols. To facilitate such implementation, the physical layers of these network interface cards and the network slot (slot-type connector) will need to have specific features.

One of the significant features is about the number of the differential pairs. For example, the network slots (network interface slot or network switch slot) may have a "sum number" of differential pairs. Meanwhile, the first network card (first network interface card or network switch card) has a "first number" of differential pairs and the second network card (second network interface card or network switch card) has a "second number" of differential pairs. To ensure compatibility, the sum number needs to be a superset of either the first number or the second number.

Figure 3:
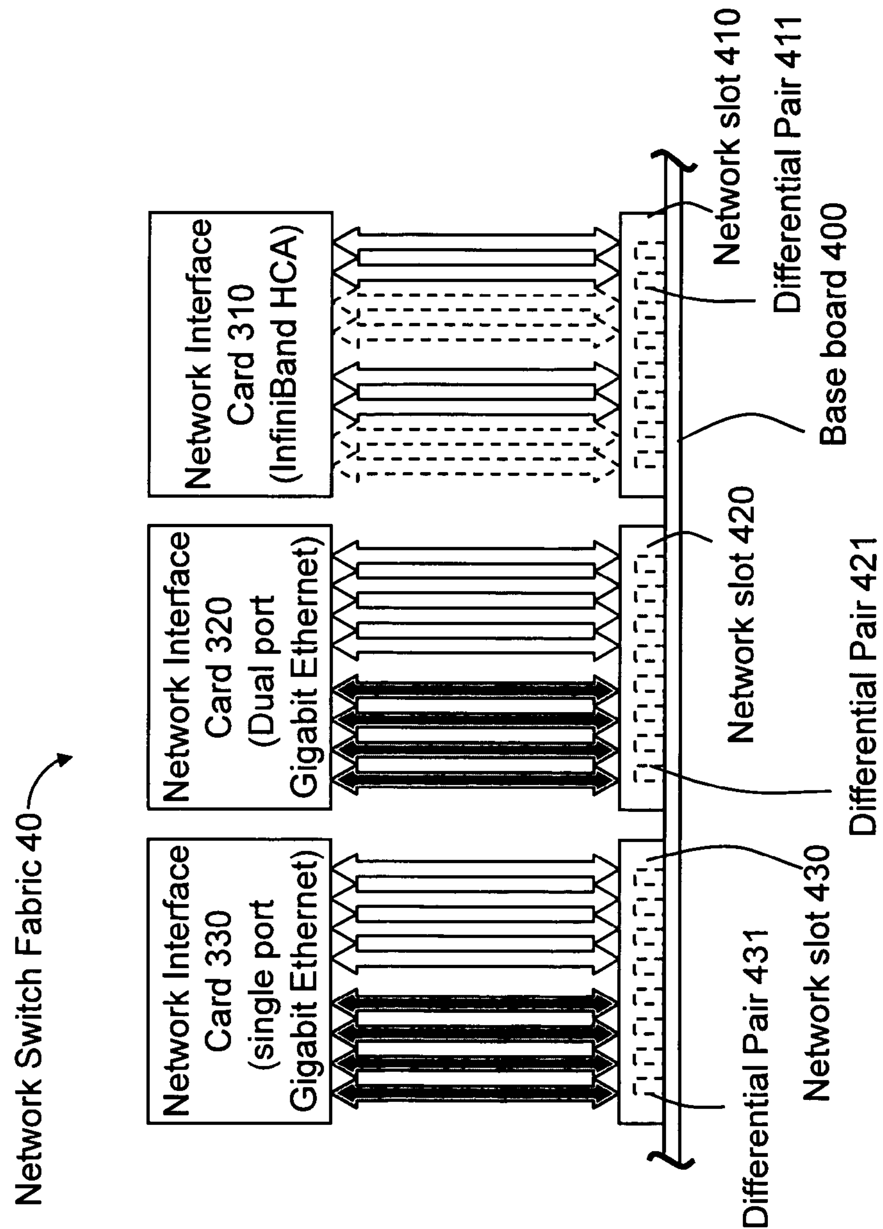
FIG. 3 is an explanatory diagram for signal assignment of network interface cards and network slots disclosed in another embodiment of the present invention.

FIG. 3 shows another embodiment of the present invention. Only a portion of the network switch fabric 40 are disclosed in FIG. 3. Three types of arrows are used in the drawing to indicate the interconnections through differential pairs: the hollow and solid ones mean different usages of interconnections; the broken ones mean not used.

In this embodiment, PCI Express is chosen to be the interconnection type of the system input/output buses (not shown). That means the physical layer of the network slots 410, 420, 430 will have to follow PCI Express as well. For the system Input/Output interface side, PCI Express lanes are typically grouped as ×1, ×2, ×4, ×8 and ×16. The large number of grouping is a superset of the small number grouping. In the embodiment, each of the network slots 410, 420, 430 provides 8 differential pairs 411/421/431 respectively. Then, considering the aforesaid requirements of differential pairs, the network switch fabric 40 will be able to support at least some specific types of interconnections, such Gigabit Ethernet, InfiniBand and etc. Gigabit Ethernet is a low cost network interface and InfiniBand is a high bandwidth network interface. Typically, Gigabit Ethernet needs 4 differential pairs in its typical physical layer. Yet InfiniBand typically uses 4 differential pairs for each direction of transiting/receiving (Tx/Rx) on copper physical layer interconnection.

Since the network slots 410, 420, 430 of network switch fabric 40 can provide enough number of differential pairs for each network interface cards 310, 320, 330, such as ×8 (like 8 differential pairs 411/421/431) for a typical high speed network interface nowadays, this would be good enough bandwidth to support InfiniBand, Gigabit Ethernet and etc. Most of common network interfaces are covered. For the physical layer of each network interface card and network slot, an AC-coupled differential signal interface is typically used. The protocol and physical layer usage would be slight different between different interfaces, but basic electrical requirements are very similar. Thus, physical wire connection here can be shared. If a network interface only needs less than 8 pairs, unused wire can be left open.

With those considerations mentioned above, the user can pick like those disclosed in FIG. 3: InfiniBand HCA (Host Channel Adapter) (network interface card 310 uses 4 differential pairs for Rx link and another 4 for Tx link), dual port Gigabit Ethernet (network interface card 320 uses 2*4 differential pairs for two ports), Single port Gigabit Ethernet (network interface card 330 uses 4 differential pairs and 4 used pairs are left open), and even 10 Gigabit Ethernet (not shown). Therefore same base design of network switch fabric will always stay the same. Whenever the clustering system needs to use different network interface, just simply replace the network interface card and the network switch card.

Figure 4:
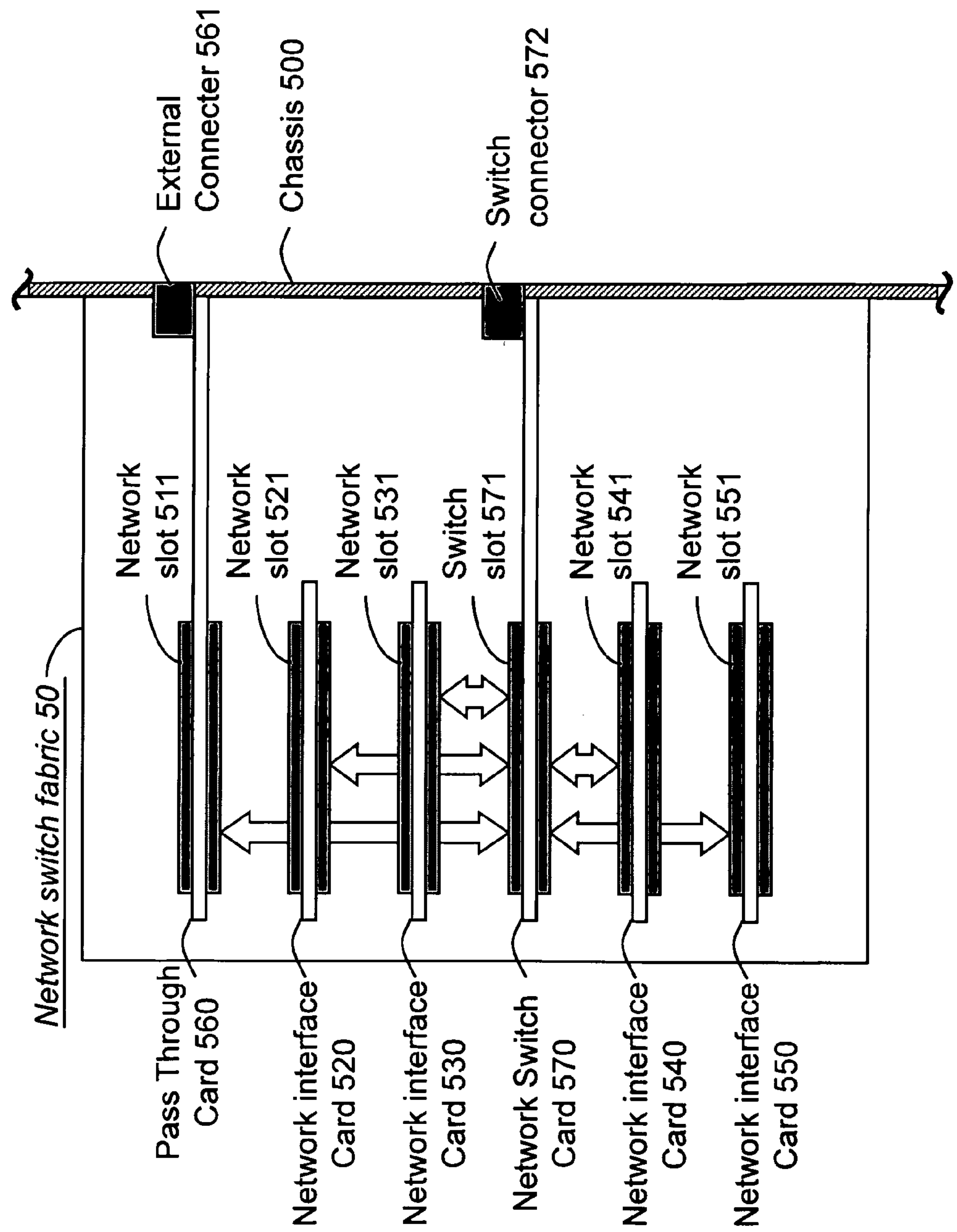
FIG. 4 is an explanatory diagram for a flexible network switch fabric disclosed in another embodiment of the present invention.

Please refer to FIG. 4. For those large scale clustering systems that do not need embedded network switch in a chassis, a network switch fabric 50 is provided to fulfill the needs. Only a portion of the network switch fabric 50 is disclosed in the drawing. In a large scale clustering system, users usually use external network switch (outside of the chassis of the clustering system in the present invention) to avoid extra overhead with extra layers of switch.

In FIG. 4, the network switch fabric 50 includes network slots 511,521,531,541,551 for inserting with a pass through card 560 and normal network interface cards 520, 530, 540, 550. Actually, the pass through card 560 may be selectively inserted in any of the network slots 511,521,531,541,551 to replace the normal network interface card. Generally the network slots 511,521,531,541,551 provide interconnections towards the switch slot 571 and the network switch card 570. And the normal network interface card 520~550 will be able connect with an external network through the network switch card 570 and its switch connector 572 configured on the chassis 500 (usually on the front or back panel). Now since the pass through card 560 is substantially another network interface card with longer length (longer than normal network interface card) and an external connector 561 configured on the chassis 500, the pass through card 560 will be able to directly connect the external network.

In FIG. 4, all modules are arranged in parallel. Even if user uses a pass through Network interface card module to provide external network interface directly instead of the network switch module, there is no mechanical interference. This placement of the pass through card allows the small-scale clustering system using for large-scale clustering, without changing any basic system infrastructure. Namely, such network switch fabric with the pass through card(s) will make the clustering system much more scalable.

Here is a summary of advantages for this invention. First of all, Flexible network selection with the same system infrastructure is provided. The same set of network interface slots and network switch slot can be used for different network interface with the same base board design. And the same fabric base board design can provide pass through feature. Moreover, the fabric can be used as a network fabric (switch/pass through) or other I/O implementation such as storage fabric. Furthermore, the design is good for trouble shooting and manufacturing. Since it is easy to swap individual modules especially network interface cards and Network switch, this would help to isolate the failure and better yielding for assembly.

Briefly, to solve those disadvantages of prior art, the present invention has the following key implementations:

(1) Partitioning with Function:

To minimize dependency across different function, such as I/O, Network interface and Computation. This allows upgrading system based on function. The technology migration for CPU and I/O interface is usually independent. With this partitioning, the upgrade can be done independently. Also, partitioned network interface and network switch functions allow to swap only network-dependent parts, then the rest of system designs do not have to be changed.

(2) Allocate Enough Physical Space for Input/Output Portion to Achieve Multiple Function/Implementation:

This allows more flexibility for the I/O implementation. With enough space allocation, the system allows another level of functional partitioning such as Network interface and Network switch in the system. To achieve the same function, we do not have to do all embedded design onto the I/O fabric base module like the implementations on Sun Blade 8000 series.

(3) Share Physical Routing Across Different Network Interface:

Most of Network interface has similar electrical characteristics, such as similar differential signaling with AC coupling. Thus, a same routing can be shared. This also allows providing flexibility to select various network interfaces in the system.

(4) Optimized Signal Assignments to Support Multiple Network Interface

Sometime, the number of signals for each network interface is different. If the system designer carefully assigns a set of signals from one network interface to the network switch, even if the number of signals for each network interface is different, the system can support different network interface on the same connector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network switch fabric for a clustering system with a plurality of nodes, each node having a first system input/output bus and a second system input/output bus, comprising:

a base board;

at least a first network switch and a second network switch being configured on the base board;

a plurality of network slots, divided into a first group and a second group, each having a sum number of differential pairs and being configured on the base board, each of said plurality of network slots of the first group being in circuit connection with the first network switch and being connected with a respective one of the nodes through the first system input/output bus thereof, and each of said plurality of network slots of the second group being in circuit connection with the second network switch and being connected with a respective one of the nodes through the second system input/output bus thereof; and a first network interface card inserted in a first network slot of said first group and a second network interface card inserted in said second network slot of said second group, the first network interface card having a first number of differential pairs and the second network interface card having a second number of differential pairs, the sum number being a superset of either the first number or the second number;

wherein the first network interface card and the second network interface card are configured with different network interconnection protocols;

wherein each node is connected via its first system input/output bus to a network slot in the first group and via its second system input/output bus to a network slot in the second group.

2. The network switch fabric of claim 1, wherein the first network switch comprises a first switch slot inserted with a first network switch card and the second network switch comprises a second switch slot inserted with a second network switch card.

3. The network switch fabric of claim 2, wherein the first network switch card is compatible with the first network interface card and the second network switch card is compatible with the second network interface card.

4. The network switch fabric of claim 2, wherein the first network interface card and the first network switch card are compatible with Giga Ethernet, the second network interface card and the second network switch card are compatible with InfiniBand.

5. The network switch fabric of claim 1 further comprising a pass through card selectively inserted in one of the network slots to directly connect an external network without passing through the network switch.

6. The network switch fabric of claim 5, wherein the pass through card is another network interface card with longer length and an external connector to directly connect the external network.

7. A network switch fabric for a clustering system with a plurality of nodes, each node having a first system input/output bus and a second system input/output bus, comprising:

a base board;

at least a first network switch and a second network switch being configured on the base board;

a plurality of network slots including a first network slot and a second network slot, each having a sum number of differential pairs and being configured on the base board, the first network slot being in circuit connection with the first network switch and being connected with one of the plurality of the nodes through the first system input/output bus thereof, and the second network slot being in circuit connection with the second network switch and being connected with said one of the plurality of nodes through the second system input/output system bus thereof; and at least a first network interface card inserted in said first network slot and a second network interface card inserted in said second network slot, the first network interface card having a first number of differential pairs and the second network interface card having a second number of differential pairs, the sum number being a superset of either the first number or the second number;

wherein the first network interface card and the second network interface card are configured with different network interconnection protocols.

8. The network switch fabric of claim 7, wherein the first network switch comprises a first switch slot inserted with a first network switch card and the second network switch comprises a second switch slot inserted with a second network switch card.

9. The network switch fabric of claim 8 wherein the first network switch card is compatible with the first network interface card and the second network switch card is compatible with the second network interface card.

10. The network switch fabric of claim 8, wherein the first network interface card and the first network switch card are compatible with Giga Ethernet, the second network interface card and the second network switch card are compatible with InfiniBand.

11. The network switch fabric of claim 7 further comprising a pass through card selectively inserted in one of the network slots to directly connect an external network without passing through the network switch.

12. The network switch fabric of claim 11, wherein the pass through card is another network interface card with longer length and an external connector to directly connect the external network.

13. A network switch fabric for a clustering system with a plurality of nodes, each node having a first system input/output bus and a second system input/output bus, comprising:

a base board;

a first network switch and a second network switch being configured on the base board;

a plurality of first network interfaces configured on the base board, each being in circuit connection with the first network switch and each connected with a respective one of the nodes through the first system input/output bus thereof to allow the nodes connect with each other and to a first external network; and a plurality of second network interfaces configured on the base board, each being in circuit connection with the second network switch and each connected with a respective one of the nodes through the second system input/output system bus thereof to allow the nodes connect with each other and to a second external network;

wherein the plurality of first network interfaces are configured with a network interconnection protocol different than the plurality of second network interfaces;

wherein each node is connected via its first system input/output bus to one of said first network interfaces and via its second system input/output bus to one of said second network interfaces.

14. The network switch fabric of claim 13, wherein each of the first network interfaces comprises a network slot with a first network interface card inserted therein and each of the second network interfaces comprises another same network slot with a second network interface card inserted therein.

15. The network switch fabric of claim 14 further comprising a pass through card selectively inserted in the network slot to directly connect with the first or second external network without passing through the first or second network switch.

16. The network switch fabric of claim 15, wherein the pass through card is another network interface card with longer length and an external connector to directly connect with the first or second external network.

17. The network switch fabric of claim 13, wherein the first network switch comprises a first switch slot selectively inserted with a first network switch card.

18. The network switch fabric of claim 13, wherein the second network switch comprises a second switch slot selectively inserted with a second network switch card.

* * * * *